(12) United States Patent
Song et al.

(10) Patent No.: US 8,392,921 B2
(45) Date of Patent: Mar. 5, 2013

(54) APPARATUS AND METHOD OF COORDINATING OPERATION ACTION OF ROBOT SOFTWARE COMPONENT

(75) Inventors: Byoung-Youl Song, Daejeon (KR);
Seung-Woog Jung, Daejeon (KR);
Choul-Soo Jang, Daejeon (KR);
Sung-Hoon Kim, Daejeon (KR);
Hyun-Kyu Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 265 days.

(21) Appl. No.: 12/970,318

(22) Filed: Dec. 16, 2010

(65) Prior Publication Data
US 2011/0154361 A1 Jun. 23, 2011

(30) Foreign Application Priority Data

Dec. 18, 2009 (KR) .................. 10-2009-0127073
Feb. 19, 2010 (KR) .................. 10-2010-0015262

(51) Int. Cl.
*G06F 9/46* (2006.01)
(52) U.S. Cl. ........ 718/100; 718/106; 700/245; 709/208; 709/219
(58) Field of Classification Search .................. None
See application file for complete search history.

(56) References Cited

U.S. PATENT DOCUMENTS

| 2003/0040839 A1* | 2/2003 | Sabe et al. ............ 700/245 |
| 2008/0005255 A1* | 1/2008 | Fernando et al. ....... 709/208 |
| 2008/0189396 A1* | 8/2008 | Fujii .................... 709/219 |

FOREIGN PATENT DOCUMENTS

| JP | 2008-191773 | 8/2008 |
| KR | 1020080053086 | 6/2008 |
| KR | 1020080073414 | 8/2008 |

* cited by examiner

*Primary Examiner* — Emerson Puente
*Assistant Examiner* — Dong Kim
(74) *Attorney, Agent, or Firm* — Nelson Mullins Riley & Scarborough LLP; EuiHoon Lee, Esq.

(57) ABSTRACT

Provided are an apparatus and a method of controlling the execution of components without an additional port or messaging for applying the dependency among the components. The apparatus comprises: a profile analyzing unit analyzing execution dependency information of components defined in an execution coordination profile; a component managing unit arranging the components in accordance with the execution sequence of the components caused by the execution dependency information; an execution coordination managing unit determining whether or not each of the components executes the operation on the basis of the execution dependency information of the corresponding component managed by the execution coordination units allocated to the components, respectively; and an operation executing unit executing the operation of each of the components in accordance with the determination result of the execution coordination manager.

13 Claims, 4 Drawing Sheets

```
<coordination>
    <depends source="SubTest"target="HelloMaker"/>
    <depends source="SubTest"target="MessagePrinter"/>
</coordination>
```

APPARATUS AND METHOD OF COORDINATING OPERATION ACTION OF ROBOT SOFTWARE COMPONENT

CROSS REFERENCE TO RELATED APPLICATION

This application claims the benefit of Korean Patent Application No. 10-2009-0127073, filed on Dec. 18, 2009 and Korean Patent Application No. 10-2010-0015262, filed on Feb. 19, 2010, which are hereby incorporated by reference in its entirety into this application.

BACKGROUND OF THE INVENTION

1. Field of the Invention

The present invention relates to an apparatus and a method of coordinating an operation action of a robot software component, and more particularly, to an apparatus and a method of designating, in an application operated in a robot software component framework, the execution order among components constituting the corresponding application and arranging and execute an operation so as to perform a key operation of a corresponding component in accordance with the designated order.

2. Description of the Related Art

Presently, the operation of a robot software component employs a scheme in which one thread is allocated to one component, such as open robot control software (OROCOS) or a robot technology component (RTC). Of course, in addition to the scheme, a scheme in which one application has one process, such as openJAUS, a scheme in which one thread processes the operations of a plurality of components having the same cycle, such as an open platform for robotic services (OPROS) component frame work, and the like are employed.

As such, under an environment where many components are operated, the components may be dependent on each other.

For example, as shown in FIG. 1, it is assumed that a pedestrian detection component 14 that detects a pedestrian through data transferred from an image sensor component 10 and a laser sensor component 12 is configured.

The pedestrian detection component 14 should use both results from two sensor components 10 and 12 in accordance with its characteristic. If only one data exists, when the pedestrian detection component 14 is configured in a scheme in which the corresponding data is removed, the pedestrian detection component 14 needs to be executed after receiving the data from the image sensor component 10 and the laser sensor component 12 every execution cycle. When the pedestrian detection component 14 is executed earlier than one between the sensor components 10 and 12, a value in the corresponding execution cycle is removed. Meanwhile, when waiting until all data are inputted, the pedestrian detection component 14 does not process the components in the corresponding execution cycle but processes the components in the next execution cycle.

As described above, the pedestrian detection component 14 is dependent on the action of the image sensor component 10 and the laser sensor component 12.

In the prior art, when the components are dependent on each other, a dependent component among components processed in different threads continuously checks a predetermined variable indicating a state of a preceding component. According to the checking result, when the dependent component reaches a predetermined state, the dependent component performs its own operation. Meanwhile, when components processed by different processes are dependent on each other, the dependent components are configured to react to a predetermined event message through network messaging or interprocess communication (IPC).

However, in all of the methods, the dependent component should acquire the state of the preceding component or process a particular event message of the preceding component.

For the dependency, a component developer should include the corresponding mechanism when preparing the component. The preceding component should have an extra variable so as to allow the component depending on itself to a processing state of the preceding component itself. The preceding component should be prepared to notify its own action state by establishing a predetermined port that enables accessing the corresponding variable or through messaging.

The method cannot be applied when the component developer does not know whether or not the component prepared by the component developer will be used in dependent application afterwards. Even though the component is prepared under the dependent environment, the component cannot be used under an environment other than a predetermined environment.

For example, when the pedestrian detection component is configured as shown in FIG. 1 by using the prior art, the image sensor component 10 used by the pedestrian detection component 14 should previously know that a component which is dependent on the corresponding component exists during a development stage. Further, the image sensor component 10 should be configured to have an additional port that allows another component to know the execution state of the image sensor component 10, which is other than a port that transfers an image to another component or to notify the completion of the operation through messaging.

SUMMARY OF THE INVENTION

The present invention has been made in an effort to overcome a problem of the prior art described above and provide an apparatus and a method of defining the dependency among components in a runtime without an additional port or messaging for applying the dependency among the components, setting the execution sequence of the components in accordance with the defined dependency, and controlling the execution of components which are influenced depending on the execution result of the component at the execution stage.

An embodiment of the present invention provides an apparatus of coordinating an operation act of a robot software component that comprises: a profile analyzing unit analyzing execution dependency information of components defined in an execution coordination profile; a component managing unit arranging the components in accordance with a execution sequence of the components based on the execution dependency information; an execution coordination managing unit determining whether or not each of the components can execute the operation on the basis of the execution dependency information of the corresponding component managed by the execution coordination units allocated to the components, respectively; and an operation executing unit executing the operation of each of the components in accordance with the determination result of the execution coordination managing unit.

The execution sequence of the components may be set based on the execution dependency information in a runtime.

The component managing unit may allocate the execution coordination units to the components and register the execution coordination units in the execution coordination managing unit.

The component managing unit may arrange the components on an operation table of the operation executing unit in sequence on the basis of the execution dependency information.

The operation executing unit may have an operation table where two or more components and execution coordination units, which are allocated to two or more components respectively to manage the execution dependency information of the corresponding component, are arranged.

The operation executing unit may verify whether or not all preceding operations of the corresponding component are executed through the execution coordination managing unit before executing the operation of each component.

The operation executing unit may execute the operation of the corresponding component when all the preceding operations of the corresponding component are executed.

The operation executing unit may suspend the operation of the corresponding component and execute next operation when all the preceding operations of the corresponding component are not executed or not yet completed.

The operation executing unit may update a state of condition of the execution coordination unit of the corresponding component through the execution coordination manager when the operations of all the components are executed.

Another embodiment of the present invention provides a method of coordinating an operation action of a robot software component that comprises: analyzing execution dependency information of components defined in an execution coordination profile by a profile analyzing unit; arranging the components in accordance with the execution sequence of the components based on the execution dependency information by a component managing unit; determining whether or not each of the components can execute the operation on the basis of the execution dependency information of the corresponding component managed by the execution coordination units allocated to the components, respectively by an execution coordination managing unit; and executing the operation of each of the components in accordance with the determination result of the execution coordination managing unit by an operation executing unit.

The execution sequence of the components may be set based on the execution dependency information in a runtime.

The execution coordination units may be allocated to the components, respectively by the component managing unit and registered in the execution coordination managing unit.

The arranging of the components may arrange the components on an operation table of the operation executing unit in sequence on the basis of the execution dependency information.

The executing of the operation may verify whether or not all preceding operations of the corresponding component are executed through the execution coordination managing unit before executing the operation of each component.

The executing of the operation may execute the operation of the corresponding component when all the preceding operations of the corresponding component are executed.

The executing of the operation may suspend the operation of the corresponding component and execute next operation when all the preceding operations of the corresponding component are not executed or not yet completed.

The method may further comprise updating a condition state of the execution coordination unit of the corresponding component through the execution coordination managing unit when the operations of all the components are executed, by the operation executing unit.

According to the embodiments of the present invention, it is possible to define the dependency among components in a runtime in various component applications.

Accordingly, it is possible to prevent the malfunction of the components due to an execution sequence.

It is possible to optimize the application of the component by matching the arrangement of the components with an execution flow expected while configuring the application.

DETAILED DESCRIPTION OF THE PREFERRED EMBODIMENTS

Hereinafter, an apparatus and a method of coordinating an operation action of a robot software component according to an exemplary embodiment of the present invention will be described with reference to the accompanying drawings. The terms and words used in the present specification and claims should not be interpreted as being limited to typical meanings or dictionary definitions. Accordingly, exemplary embodiments disclosed in the specification and configurations shown in the accompanying drawings are just the most preferred embodiment, but are not limited to the spirit and scope of the present invention. Therefore, at this application time, it will be appreciated that various equivalents and modifications may be included within the spirit and scope of the present invention.

Figure 1:
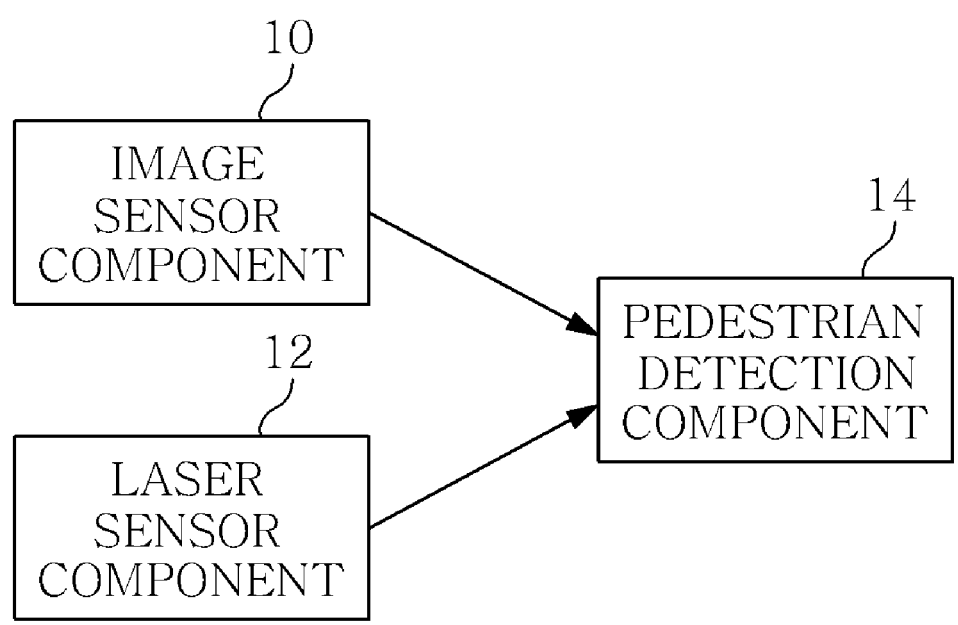
FIG. 1 is a block diagram for describing a prior art.
Figure 2:
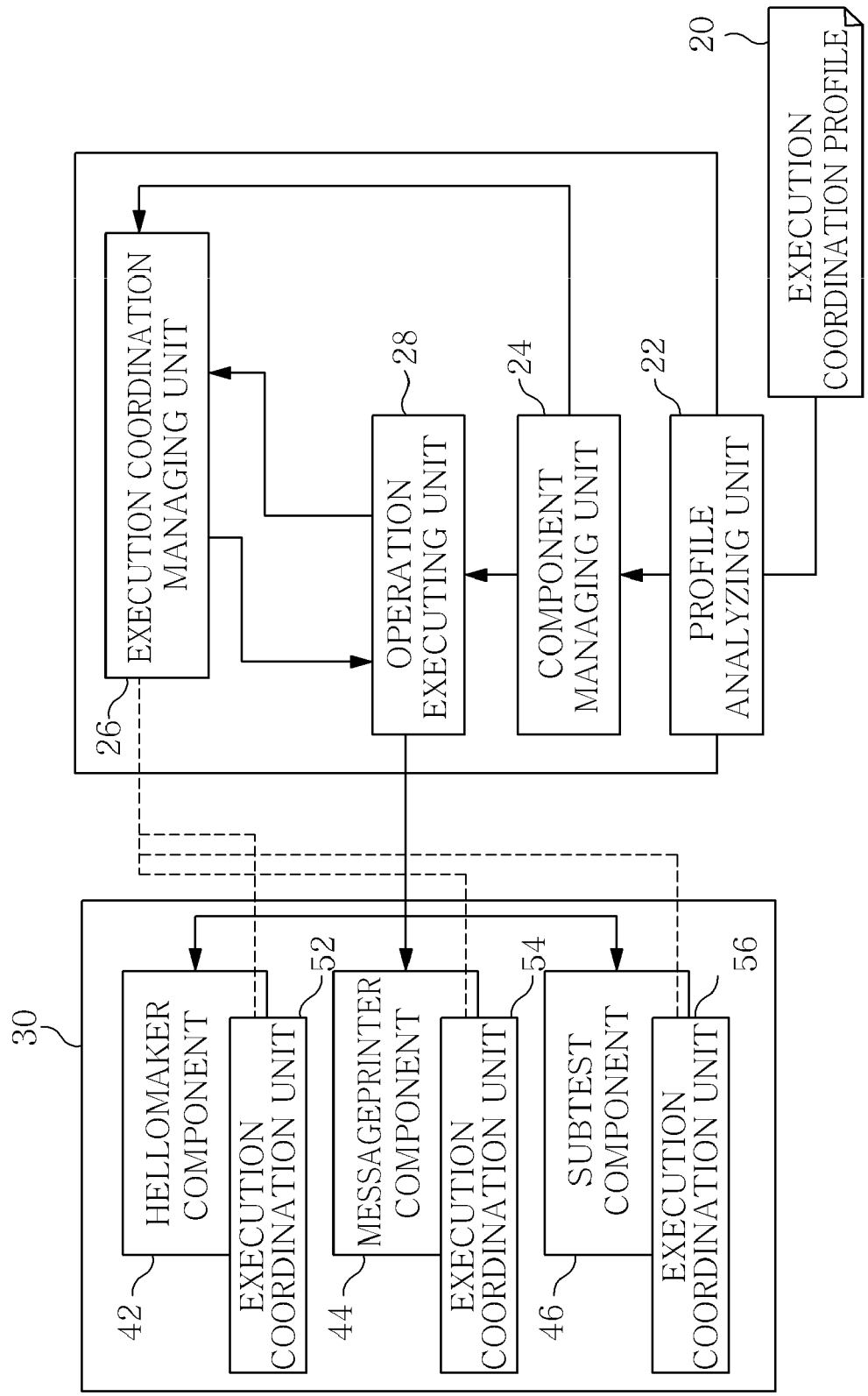
FIG. 2 is a block diagram for describing an apparatus of coordinating an operation action of a robot software component according to an embodiment of the present invention.

FIG. 2 is a block diagram for describing an apparatus of coordinating an operation action of a robot software component according to an embodiment of the present invention.

The robot software component operation action coordinating apparatus shown in FIG. 2 comprises a profile analyzing unit 22, a component managing unit 24, an execution coordination managing unit 26, and an operation executing unit 28.

The profile analyzing unit 22 analyzes execution dependency information of components 42, 44, and 46 defined in an execution coordination profile 20. The profile analyzing unit 22 transfers the analysis result to the component managing unit 24. The execution coordination profile 20 includes data clearly describing the dependency among the components 42, 44, and 46 by a component application producer.

The component manager 24 arranges, in sequence, the components on an operation table 30 of the operation execution unit 28 in accordance with the execution sequence of the components 42, 44, and 46 caused by the execution dependency information. Preferably, the execution sequence of the components 42, 44, and 46 is set based on the execution dependency information in a runtime. Herein, the runtime may represent a time corresponding to an operation cycle of the operation executing unit 28. The component manager 24 allocates execution coordination units 52, 54, and 56 to the components 42, 44, and 46, respectively and registers them in the execution coordination managing unit 26. Each of the execution coordination units 52, 54, and 56 manages the execution dependency information of the corresponding component.

The execution coordination managing unit 26 determines whether or not each of the components 42, 44, and 46 can execute the operation on the basis of the execution dependency information of the corresponding component managed by the execution coordination units 52, 54, and 56 allocated to the components 42, 44, and 46, respectively. That is, the execution coordination managing unit 26 receives a question whether each of the components 42, 44, and 46 can execute the operation from the operation executing unit 28, and determines whether or not each component can execute the operation and notifies the determination result to the operation executing unit 20.

The operation executing unit 28 executes the operation of each of the components 42, 44, and 46 in accordance with the determination result of the execution coordination managing unit 26. The operation executing unit 28 has an operation table 30. Two or more components 42, 44, and 46 and the execution coordination units 52, 54, and 56 representing the execution dependency information of the corresponding component at the component execution stage by being allocated to each of two or more components are arranged in the operation table 30. The operation executing unit 28 verifies whether or not a component which the operation execution unit 28 wants to execute conforms to an execution condition to the execution coordinate managing unit 26 every operation cycle. After verification, the operation executing unit 28 executes the operation of each of the components 42, 44, and 46, and updates a condition depending on the execution result and rearranges the operation sequence. That is, the operation executing unit 28 verifies whether or not all preceding operations of the corresponding component are normally performed through the execution coordination managing unit 26 before executing the operation of each component. When all of the preceding operations of the corresponding component are normally performed, the operation executing unit 28 performs the operation of the corresponding component. When all of the preceding operations of the corresponding component are not normally executed or are not yet completed, the operation executing unit 28 suspends the operation of the corresponding component and executes the next operation. The operation executing unit 28 updates a state of condition of an execution coordination unit of the corresponding component through the execution coordination managing unit 26 when all the operations of the component are normally executed.

In FIG. 2, although only one operation executing unit 28 is shown, it may be regarded that a plurality of operation executing units 28 are provided.

Figures 3, 4:
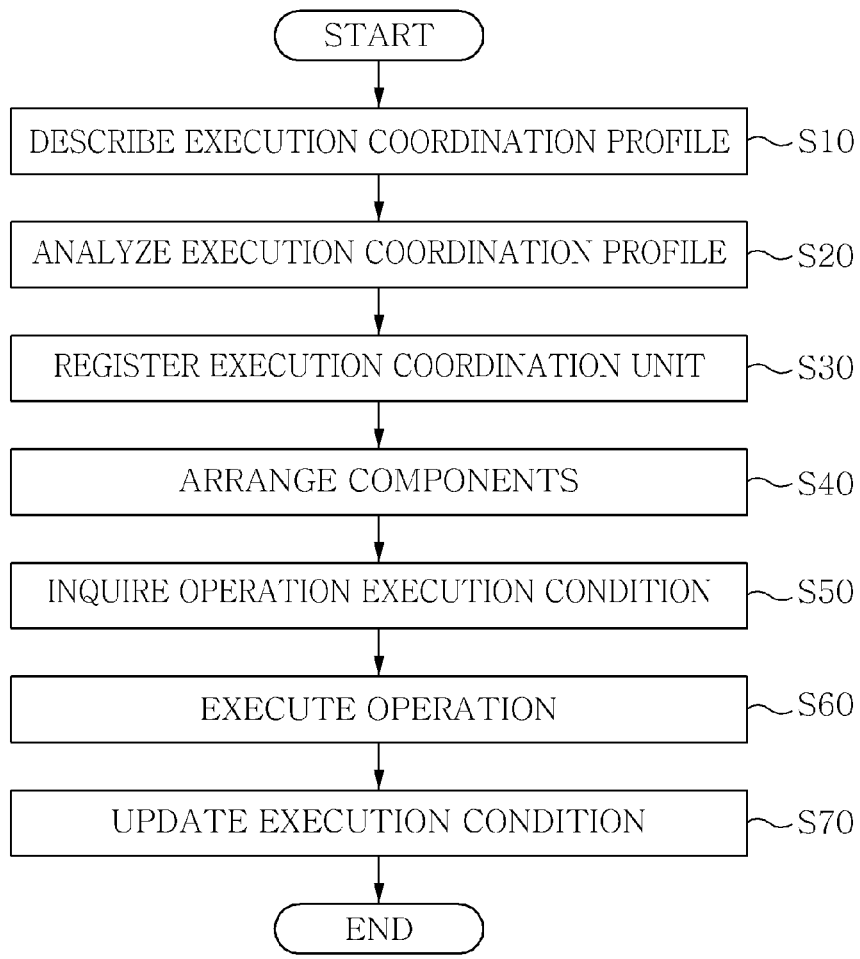
FIG. 3 is a flowchart for describing a method of coordinating an operation action of a robot software component according to an embodiment of the present invention.
FIG. 4 is an example of an execution coordination profile defining execution dependency of a component as an example adopted in the description of FIG. 3.
Figure 5:
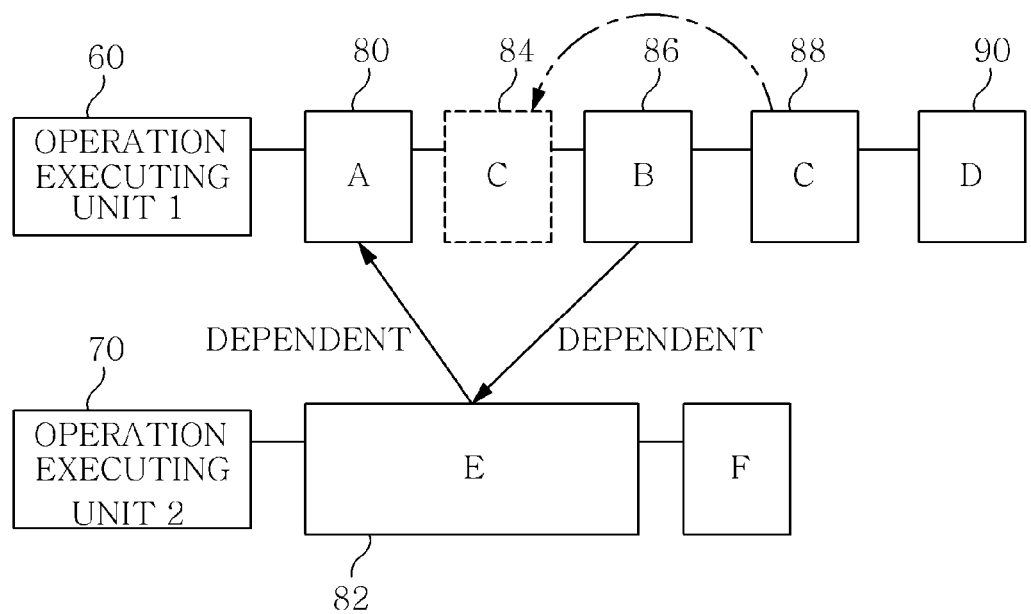
FIG. 5 is a diagram for describing a process of rearranging an operation depending on execution dependency of a component as an example adopted in the description of FIG. 3.

Subsequently, a method of coordinating an operation action of a robot software component according to an embodiment of the present invention will be described in detail with reference to a flowchart of FIG. 3. FIG. 4 is an example of an execution coordination profile defining execution dependency of a component as an example adopted in the description of FIG. 3. FIG. 5 is a diagram for describing a process of rearranging an operation depending on execution dependency of a component as an example adopted in the description of FIG. 3.

First, describing an execution coordination profile (S10) is performed. An application developer may define the execution coordination profile 20 in the form of a file, and the like. A content defined in the execution coordination profile 20 represents dependency among components. In the case of the execution coordination profile shown in FIG. 4, a component "SubTest" is defined to be dependent on a component "HelloMaker" and components "MessagePrinter". That is, the component "HelloMaker" 42 and the component "MessagePrinter" 44 of FIG. 2 should be executed earlier than the component "SubTest" 46.

Next, analyzing the execution coordination profile (S20) is performed. A profile analyzing unit 22 analyzes the execution coordination profile 20 and transfers information indicating a component dependency relationship to a component managing unit 22.

Next, registering an execution coordination unit (S30) is performed. The component managing unit 24 loads components 42, 44, and 46 and allocates execution coordination units 52, 54, and 56 to the components 42, 44, and 46, respectively. Herein, the components 42, 44, and 46 are randomly loaded regardless of the execution dependency relationship. Since the relationships among the execution coordination units 52, 54, and 56 cannot be connected with each other, the component managing unit 24 registers the execution coordination units 52, 54, and 56 to the execution coordination managing unit 26 by using component information as a key value. When each of the execution coordination units 52, 54 and 56 are registered, the connections among the execution coordination units 52, 54, and 56 are updated depending on the component dependency relationship. For example, when the component 46 is the first loaded, the execution coordination units 52 and 54 are not generated while the components 42 and 44 on which the component 46 depends are not yet loaded.

As a result, it is impossible to set the relationship between the execution coordination unit 56 and other execution coordination units 52 and 54. Therefore, the component managing unit 24 registers the firstly generated execution coordination unit 56 in the execution coordination managing unit 26. Thereafter, when the component 44 is loaded and the execution coordination unit 54 is generated, the component managing unit 24 finds that the execution coordination unit 56 depending on the execution coordination unit 54 is registered in the execution coordination managing unit 26. As a result, the component managing unit 24 adds the execution coordination unit 54 to the execution coordination unit 56 as a prerequisite and adds the execution coordination unit 56 to the execution coordination unit 54 as a subsequent operation. Thereafter, the operation is repetitively performed at the time of loading other components and finally, a dependency relationship which the application developer requires is constructed.

Next, arranging components (S40) is performed. The component managing unit 24 arranges the components on the operation table 30 of the operation executing unit 28 in sequence in accordance with the execution sequence of the components.

Next, inquiring an operation execution condition (S50) is performed. The operation executing unit 28 performs the components 42, 44, and 46 to be performed in the operation table 30 every operation cycle one by one in accordance with the arrangement order. While the operation executing unit 28 performs the operations of the components 42, 44, and 46, the operation executing unit 28 inquires whether or not all of the preceding operations of the corresponding component are normally performed to the execution coordination managing unit 26 and thereafter, receives a reply to the inquiry from the execution coordination managing unit 26.

Next, executing the operation (S60) is performed. When all of the preceding operations of the corresponding component are normally performed, the operation executing unit 28 performs the operation of the corresponding component. When all of the preceding operations of the corresponding component are not normally executed or are not yet executed, the operation executing unit 28 suspends the operation of the corresponding component and executes the next operation.

For example, as shown in FIG. 5, it is assumed that a component B 86 that is arranged in an operation table (not shown) of an operation executing unit 1 60 is dependent on a component E 82 that is arranged in an operation table (not shown) of an operation executing unit 2 70. It is assumed that the component E 82 is dependent on a component A 80 that is arranged in an operation table (not shown) of the operation executing unit 1 60. In FIG. 5, an operation cycle of the operation executing unit 1 60 has a time as long as all of the operations A, B, C, and D can be executed. When the component B 86 should be executed after the operation of the component A 80 is executed in the operation executing unit 1 60, if the component E 82 on which the component B 86 depends does not yet terminate the operation, a component C 88 moves to a location of "84". As a result, the operation of the component C 88 is executed earlier than the operation of the component B 86. By this configuration, the blocked component B 86 prevents the execution of other operations from being disturbed so as to improve runtime performance. Meanwhile, if the operation of the component B 86 is not yet terminated until an operation of a final component D 90 is terminated on the operation table of the operation executing unit 1 60, the operation executing unit 1 60 determines to process the operation of the component B 86 at the next cycle without waiting any longer.

Next, updating the execution condition (S70) is performed. The operation executing unit 28 updates the states of condition of the execution coordination units 52, 54, and 56 of the components through the execution coordination managing unit 26 when all of the operations of the components 42, 44, and 46 are normally executed.

For example, when the operation of the component 42 is normally executed, the operation executing unit 28 updates one of prerequisites of the execution coordination unit 56 which is dependent on the execution coordination unit 52 to be satisfied. The execution coordination unit 56 does not satisfy the execution condition before the operation of the component 44 which is another prerequisite is normally executed. After the operation of the component 44 is executed, the execution coordination unit 56 satisfies the execution condition and is set to execute the operation of the component 46. When the execution condition is satisfied to execute the operation of the corresponding component 46, the execution condition of the execution coordination unit 56 related to the corresponding component 46 is cancelled again.

Thereafter, the execution coordination unit 56 waits for the preceding components 42 and 44 to be executed again.

While the present invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An apparatus of coordinating an operation action of a robot software component, comprising:
    a profile analyzing unit analyzing execution dependency information of components defined in an execution coordination profile of a robot;
    a component managing unit arranging the components in accordance with an execution sequence of the components based on the execution dependency information;
    an execution coordination managing unit determining whether or not each of the components executes the operation on the basis of the execution dependency information of a corresponding component managed by an execution coordination units allocated to each of the components and without a need for an additional port or messaging;
    an operation executing unit executing the operation of each of the components in accordance with the determination result of the execution coordination managing unit; and
    wherein the operation execution unit suspends the operation of the corresponding component and executes next operation when all preceding operations of the corresponding component are not executed or not yet completed.

2. The apparatus of claim 1, wherein the execution sequence of the components is set based on the execution dependency information in a runtime.

3. The apparatus of claim 1, wherein the component managing unit allocates the execution coordination units to the components and registers the execution coordination units in the execution coordination managing unit.

4. The apparatus of claim 1, wherein the component managing unit arranges the components on an operation table of the operation executing unit in sequence.

5. The apparatus of claim 1, wherein the operation executing unit has an operation table where two or more components and execution coordination units allocated to two or more components respectively to manage the execution dependency information of the corresponding component are arranged.

6. The apparatus of claim 1, wherein the operation executing unit executes the operation of the corresponding component after all the preceding operations of the corresponding component are executed.

7. The apparatus of claim 1, wherein the operation executing unit updates a state of condition of the execution coordination unit of the corresponding component through the execution coordination managing unit when the operations of all the components are executed.

8. A method of coordinating an operation action of a robot software component, comprising:
    analyzing execution dependency information of components defined in an execution coordination profile of a robot by a profile analyzing unit;
    arranging the components in accordance with an execution sequence of the components based on the execution dependency information by a component managing unit;
    determining whether or not each of the components executes the operation on the basis of the execution dependency information of a corresponding component managed by an execution coordination units allocated to each of the components and without a need for an additional port or messaging, by an execution coordination managing unit;
    executing the operation of each of the components in accordance with the determination result of the execution coordination managing unit by an operation executing unit; and
    wherein the executing of the operation suspends the operation of the corresponding component and executes next operation when all preceding operations of the corresponding component are not executed or not yet completed.

9. The method of claim 8, wherein the execution sequence of the components is set based on the execution dependency information in a runtime.

10. The method of claim 8, wherein the execution coordination units are allocated to each of the components, by the component managing unit and registered in the execution coordination managing unit.

11. The method of claim 8, wherein the arranging of the components arranges the components on an operation table of the operation executing unit in sequence.

12. The method of claim 8, wherein the executing of the operation executes the operation of the corresponding component when all the preceding operations of the corresponding component are executed.

13. The method of claim 8, further comprising updating a condition state of the execution coordination unit of the corresponding component through the execution coordination managing unit when the operations of all the components are executed, by the operation executing unit.

\* \* \* \* \*